Oct. 1, 1935.   H. E. HARTIG   2,015,933
FLUID METER
Filed March 11, 1932   4 Sheets-Sheet 1
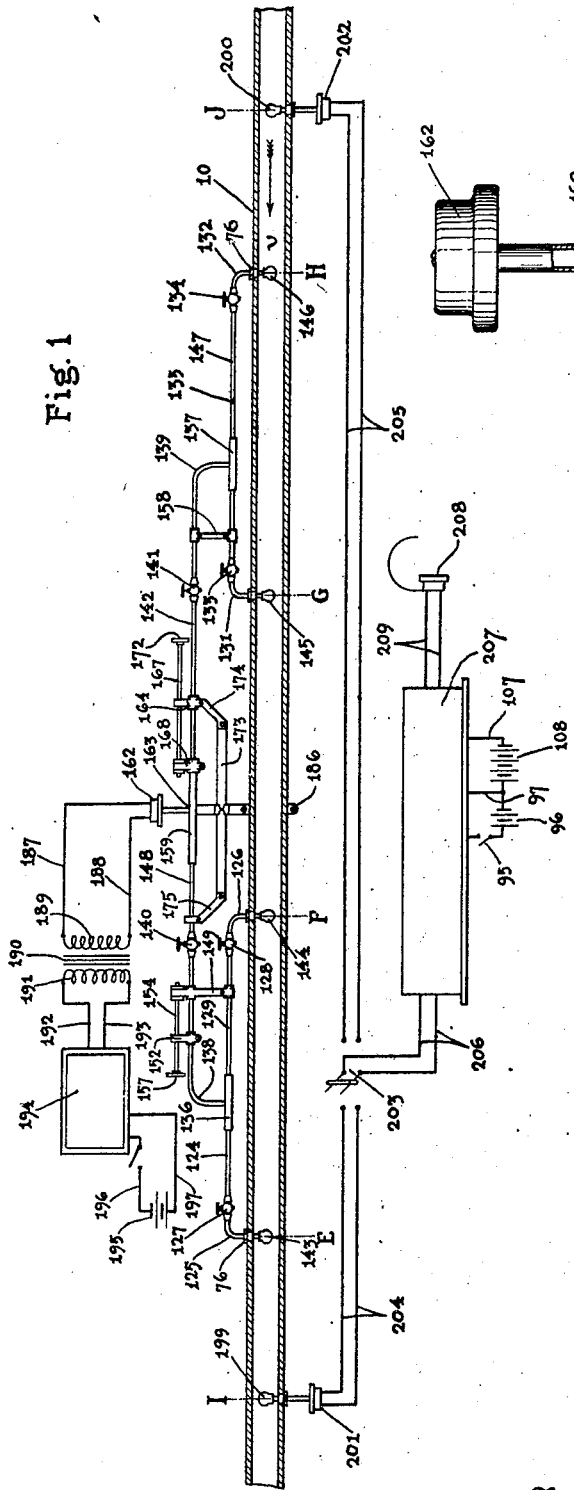
Fig. 1
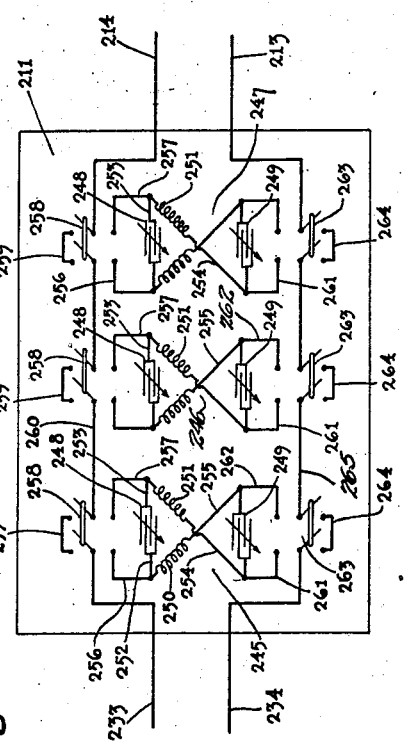
Fig. 4
Fig. 10
Inventor
Henry E. Hartig
By Caswell & Lagaard
Attorneys Oct. 1, 1935.  H. E. HARTIG  2,015,933
FLUID METER
Filed March 11, 1932  4 Sheets-Sheet 2
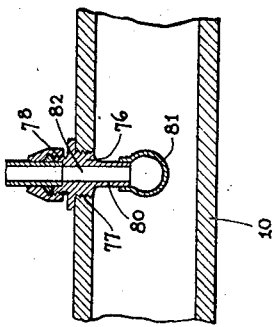
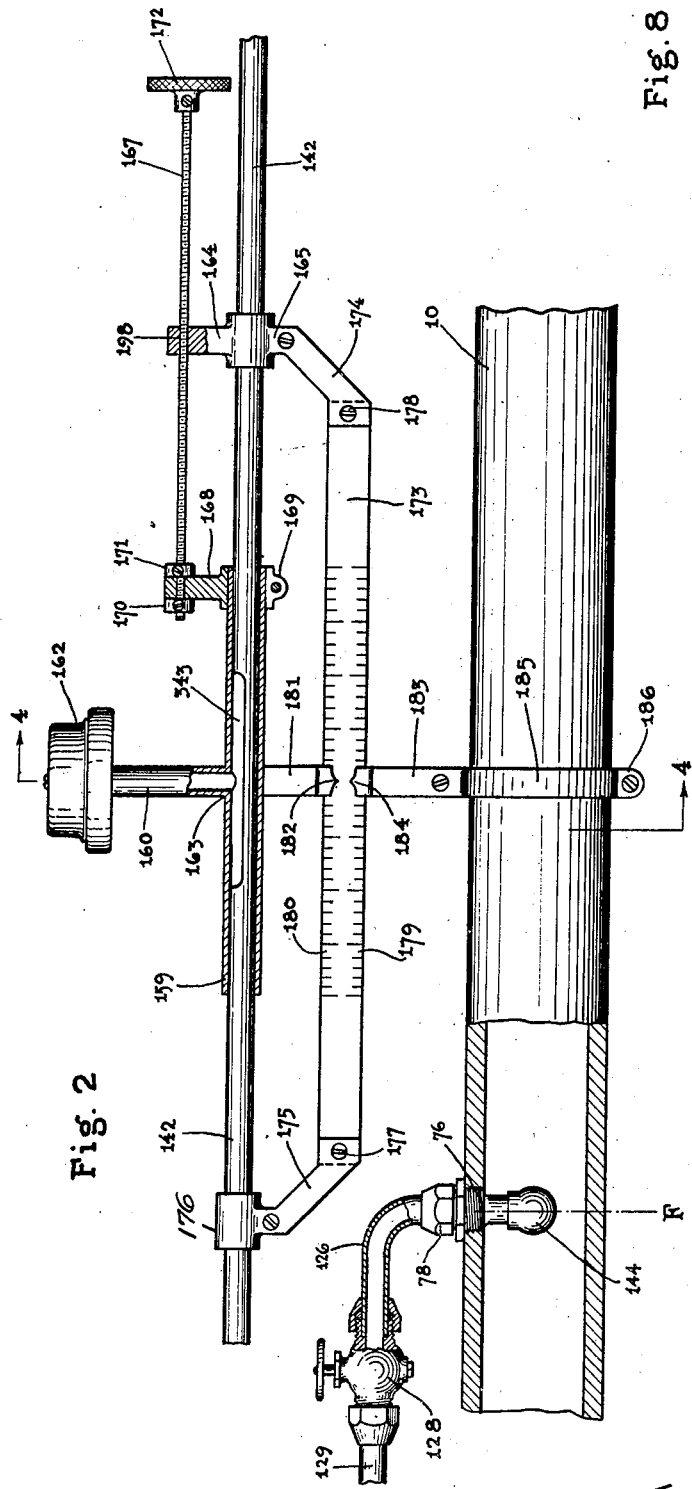
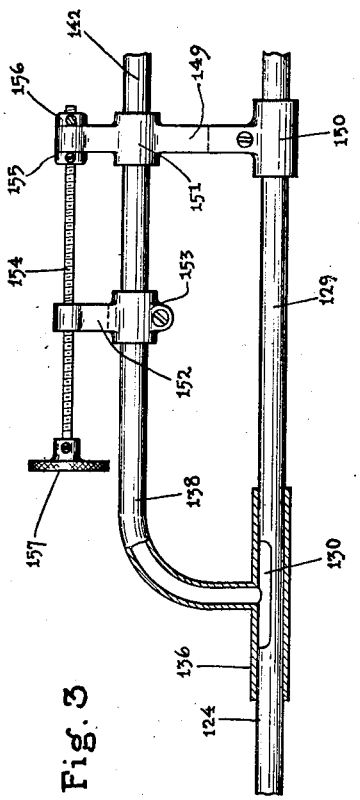
Inventor
Henry E. Hartig
By Caswell & Lagaard
Attorneys

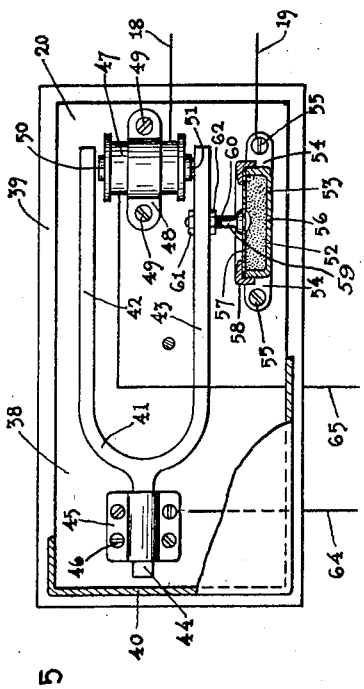

Oct. 1, 1935.   H. E. HARTIG   2,015,933
FLUID METER
Filed March 11, 1932   4 Sheets-Sheet 4
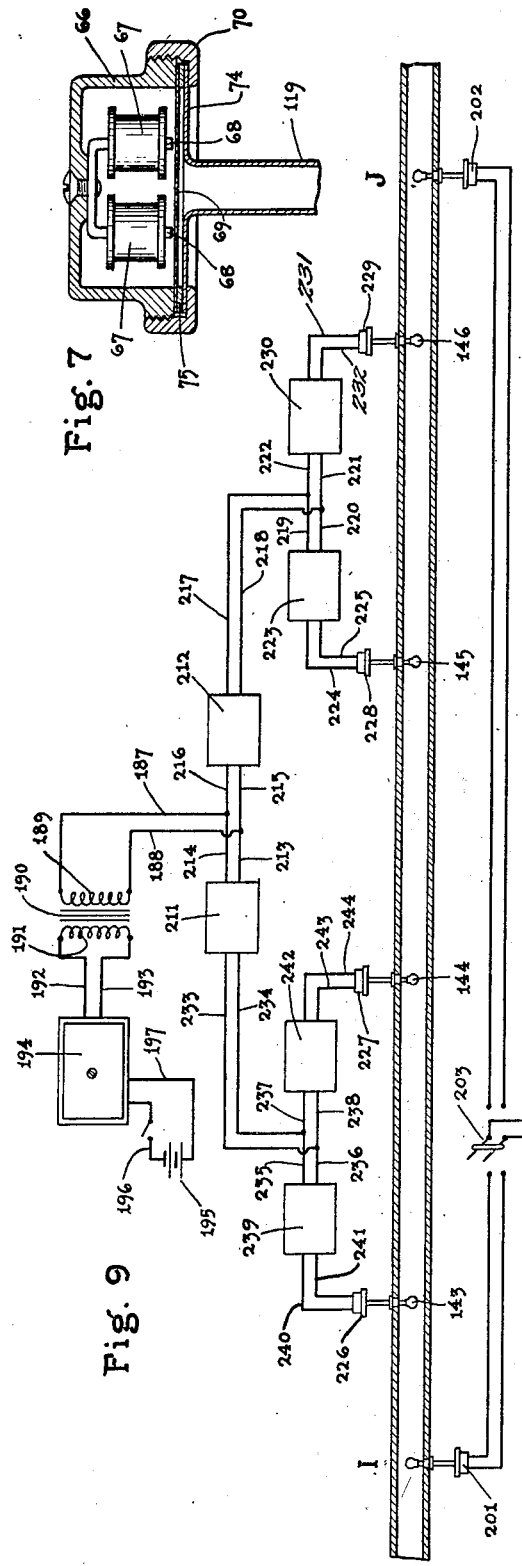
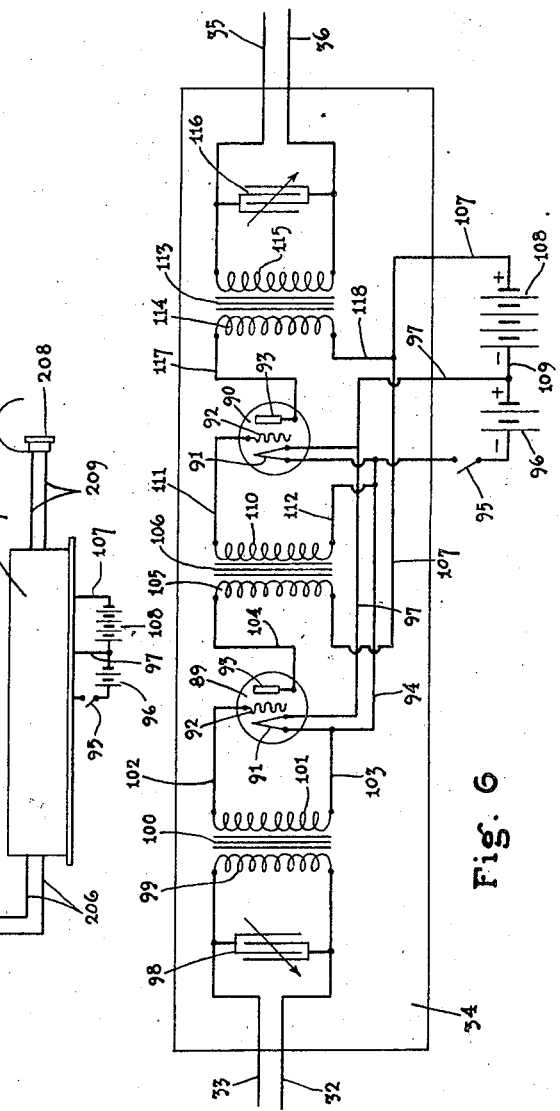
Inventor
Henry E. Hartig
By Caswell & Lagaard
Attorneys Patented Oct. 1, 1935

2,015,933

UNITED STATES PATENT OFFICE 2,015,933

FLUID METER

Henry E. Hartig, Robbinsdale, Minn., assignor of one-half to Hugh B. Wilcox, Minneapolis, Minn.

Application March 11, 1932, Serial No. 598,208

23 Claims. (Cl. 73—167)

My invention relates to fluid meters and has for an object to provide a method of measuring the flow of fluids and a meter by means of which the method may be carried out whereby great accuracy may be procured.

Another object of the invention resides in providing a meter in which vibrations of known frequency are set up in the fluid whose velocity is to be measured, and in which the velocity of the fluid is computed from the change of wave length of the vibrations caused by the flow of the fluid.

An object of the invention resides in providing a fluid meter in which two vibrations are set up in the fluid and in which the phase relation of the vibrations is adjusted to produce predetermined vibration conditions.

A still further object of my invention resides in providing a meter in which undesirable reflected sound waves are eliminated.

Another object of the invention resides in the method of measuring the flow of fluids which consists in setting up vibrations in the fluid and in setting up other vibrations adapted to completely destroy the vibrations first set up except in that part of the pipe in which the measurements are conducted whereby the possibility of disturbing reflected waves from external reflecting surfaces is eliminated.

An object of the invention resides in providing a meter which operates at a fixed frequency.

A feature of the invention resides in providing a device which does not require calibration, but which determines fluid velocity directly through linear measurement and the measurement of the frequency of the vibrations employed.

An object of the invention resides in providing a meter in which the vibrations in the fluid emanating from a single source are set up at two localities therein and in which the lengths of the paths of travel from the source to such localities are adjusted so that destructive interference between the vibrations in the fluid may be produced.

Other objects of the invention reside in the novel combination and arrangement of parts and in the details of construction hereinafter illustrated and/or described.

In the drawings:

Fig. 1 is a longitudinal, section, elevational view taken through a pipe through which the fluid to be measured travels and illustrating an embodiment of my invention applied thereto with portions of the invention shown diagrammatically.

Fig. 2 is a fragmentary elevational view of a portion of the structure shown in Fig. 1 illustrating the scales and sleeve construction together with the adjusting device therefor, said view being drawn to a larger scale than Fig. 1.

Fig. 3 is a similar fragmentary elevational view of another portion of the invention drawn to the same scale as Fig. 2.

Fig. 4 is an elevational sectional view taken on line 4—4 of Fig. 2.

Fig. 5 is a plan view of the electric generator used in the invention with a portion of the cover thereof removed.

Fig. 6 is a wiring diagram of the amplifier of the invention.

Fig. 7 is a sectional view of the vibration producing device of the invention.

Fig. 8 is a sectional view of one of the vibration transmitters of the invention.

Fig. 9 is a view similar to Fig. 1 illustrating a modification of the invention.

Fig. 10 is a wiring diagram of one of the phase shifters used with the form of the invention shown in Fig. 9.

Fig. 11 is a view similar to Fig. 1 showing a simplified form of the invention for illustrating the theory of operation thereof.

For the purpose of more readily explaining the theory of operation and the method employed with my improved meter, I have shown diagrammatically in Fig. 11, a simplified or skeleton form of my invention, parts of which are identical with other parts of the device shown in Fig. 1. It has been assumed that the fluid, whose velocity is to be measured, flows through a pipe 10 in the direction indicated by the arrow. This pipe may be part of the system through which the fluid passes or may be a special section of pipe inserted into the system and containing the various parts constituting my invention. This pipe is of relatively great length as compared to its diameter and may be connected to the system in any suitable manner as by flanged fittings, not shown in the drawings or otherwise.

The method employed in my invention consists in generating vibrations in the pipe 10, which are affected by the travel of the fluid through the pipe to change the wave length of said vibrations. The difference between the wave lengths of the vibrations measured at certain localities in the pipe in opposite directions with respect to the source of vibration is utilized to determine the actual velocity of the fluid in the pipe. For this purpose, two vibration transmitters 11 and 12 are employed which communicate with the interior of the pipe 10 at two definite localities along the length thereof which I have designated stations A and B. The distance $a$ between these stations is for purposes of explanation taken equal to a whole number of wave lengths and in the form of the invention shown in Fig. 11, it has been assumed that this distance is equal to three whole wave lengths when the fluid is not in motion. The vibration transmitters 11 and 12 are connected through an extensible tube structure 13 with a vibration producing device 14. This device is connected through conductors 15 and 16 with an electric transformer 17, which in turn is connected through conductors 18 and 19 with an electric generator 20, generating an alternating electric current of fixed frequency. Within the pipe 10 and in advance of the vibration transmitter 12 is situated a vibration detector 21. Following the vibration transmitter 11 is situated a similar vibration detector 22, these detectors being situated at localities along the pipe designated as stations C and D and located distances $b$ from the stations A and B. These distances may be equal to the distance $a$ or less than the same as desired. The detectors 21 and 22 are connected through tubes 23 and 24 to two electric pick-up devices 25 and 26, which in turn are connected through conductors 27, 28, 29, and 30 to a selector 31. The selector 31 is in the nature of a double pole double throw switch which is connected through conductors 32 and 33 with an audion amplifier 34. The amplifier 34 is connected through conductors 35 and 36 with a head phone or telephone receiver 37 or any other similar sound producing device such as a loud speaker or the like. The various parts used in the form of the invention shown in Fig. 9 above referred to will now be described in detail.

Any type of electric generator may be used. An electric generator 20 well known in the art is illustrated in detail in Fig. 5. This generator is designed for generating alternating electric current, which is accomplished by varying the strength of a direct current at predetermined regular intervals. This device includes a base 38, which is constructed of insulating material and which is formed about the outer margin thereof with a groove 39 for the reception of a cover 40 enclosing the entire mechanism of the same. The generator 20 includes a vibrator 41, which may be a tuning fork or similar device constructed with two prongs 42 and 43 and a shank 44 connected thereto. This vibrator is mounted upon the base 38 through a strap 45 which envelopes the shank 44 and which is secured to said base through a number of screws 46. The vibrator 41 is so mounted that the prongs 42 and 43 thereof extend above the upper surface of base 38 so that the same may vibrate freely when set in motion.

Between the two prongs 42 and 43 of vibrator 41 is disposed an electromagnet 47 which is attached to the base 38 by means of a strap 48, said strap being secured to the base through screws 49. This electromagnet has pole pieces 50 and 51 at opposite ends thereof which are equally spaced from the prongs 42 and 43 of vibrator 41 and which operate to attract said prongs when the coil of said electromagnet is energized and which release the prongs when the current through the coils is interrupted or weakened. Attached to the base 38 of generator 20 is a current controlling device 52 for varying or interrupting the current. This device operates on the principle of a microphone and consists of a case 53 formed with legs 54 whereby the same may be attached through screws 55 to the base 38. The case 53 is constructed with a cavity adapted to be filled with carbon particles indicated at 56. The case 53 is closed and the carbon particles retained within the same through a thin vibrating diaphragm 57 which is clamped in position on said case through a threaded collar 58. The diaphragm 57 is preferably constructed of mica or some other suitable insulating material and has attached to it at its center a stud or short bolt 59, which in turn is attached to the prong 43 of vibrator 41. This bolt extends directly through said prong and is threaded as indicated at 60 to receive two nuts 61 and 62, by means of which the diaphragm 57 may be adjusted with respect to the prong 43. As the prong 43 vibrates, a vibration is set up in the diaphragm 57 compressing and expanding the carbon particles 56 within case 53. This reduces and increases the resistance of the said carbon particles so that current flowing through the screw 60 and case 54 is caused to pulsate, varying in intensity in accordance with the pressure applied to the carbon particles 56.

The generator 20 utilizes a battery 63 or any other suitable source of direct current, which has connected to it two conductors 64 and 65. The conductor 64 is connected to the strap 45 which is in electrical contact with vibrator 41, while the conductor 65 is connected to one side of the coil of the electromagnet 47. The other side of the coil of this electromagnet is connected to the conductor 18 while conductor 19 is connected to the case 53 of the current controlling device 52.

The operation of the generator 20 is as follows: When the circuit through the battery 63 is closed as by a suitable switch 166, current flows from conductor 64 through strap 45, vibrator 41, prong 43 thereof, bolt 59, the carbon particles 56, case 53, conductor 19, transformer 17, conductor 18, the coil of electromagnet 47 and through conductor 65 back to the battery. This causes the electromagnet 47 to become energized which attracts the two prongs 42 and 43. Movement of the prong 43 relieves the pressure upon the carbon particles 56 which reduces the current passing through the same and through the coil of the electromagnet. This reduces the magnetic force acting on the prongs 42 and 43 which causes a movement of the same. As soon as the electromagnetic action on these prongs is reduced, the pressure is again increased on the carbon particles and the current increases. The steps are then repeated. In this manner, the two prongs 42 and 43 are set into vibration and pulsating current produced in the transformer 17. Due to the fact that a vibrator in the nature of a tuning fork has its own period of vibration, the frequency of the pulsations of the current produced are extremely regular and may be accurately determined. Furthermore the frequency of the pulsations with such type of device are not altered by minor changes in the voltage or condition of the battery 63 so that as long as the device operates, the same can be relied on to produce a pulsating current of predetermined regular frequency.

The vibration producing device 14 may consist of an ordinary telephone or radio receiver or phone, which is adapted to set up vibrations in the air adjoining the diaphragm thereof when the same is energized through a pulsating or alternating current. One such device is shown in Fig. 7, said device being identical in all of the forms of the invention. This device comprises a case 66 preferably constructed of insulating material which has mounted in it a magnetically polarized electromagnet 67. This magnet is formed with pole pieces 68 adapted to operate a diaphragm 69 mounted on the case. The diaphragm 69 is secured to the case through a threaded collar 70 which is adapted to clamp the same in proper position to be operated by said electromagnet. The tube structure 13, previously referred to, is formed with three branches 119, 120, and 121, which are secured together in any suitable manner. The branch 119 is attached to the vibration producing device 14 and is formed with an outwardly extending flange 74 of substantially the same diameter as the diaphragm 69. This flange is disposed adjacent the diaphragm 69 and is separated therefrom through a washer 75, said flange being clamped together with the diaphragm 69 to the case 66 through the threaded collar 70. The vibrations set up by the diaphragm 69 are transmitted to the air within the branches 119, 120, and 121 of the tube structure 13, where the same are utilized to produce the effects desired as will be presently described in detail.

Any form of vibration transmitter capable of transmitting the vibrations imparted to the air within the tube structure 13 to the fluid in the pipe 10 may be utilized. One device of this character is shown as a Brocoa tube. Such vibration transmitter is shown in detail in Fig. 8. This vibration transmitter comprises a fitting 76 which is threaded at 77 to screw into the pipe 10 at the required locality. This fitting is constructed at its outer end with a tube connection 78 which is adapted to receive the particular tube to be connected therewith. The fitting 76 terminates at its other end in a short neck 80 which extends inwardly into the pipe 10. This neck has mounted upon it a nipple 81 which is globular in form and which fits tightly over the neck 80. Where the pressure of the fluid is not greatly in excess of atmospheric pressure, the nipple 81 may be constructed of rubber or some other suitable flexible material. Where the pressure is sufficiently great, the nipple 81 may be constructed of metal or any other suitable material capable of transmitting vibrations to the fluid within the pipe 10. The fitting 76 is constructed with a bore 82 which communicates with the interior of the nipple 81 and with the tube connected to said fitting.

The tube structure 13 as previously described, comprises three branches 119, 120, and 121, the branch 119 being connected to the vibration producing device 14. The branch 120 includes a short tube 72 which is connected to tube 71 and to a valve 83. This branch further includes a bent tube 79 which is connected to the detector 11 through the tube connection 78 thereof.

The branch 121 of tube structure 13 includes a tube 73 which is enlarged at its outer end as indicated at 86 to form a longitudinal bore 87 in which another tube 88 is slidable. The tube 88 is connected to a hose 85 which in turn is connected to a short tube 84 issuing outwardly from the fitting 76 of transmitter 12. By means of this construction, the length of the paths through the tube structure for the transmission of the vibrations produced by the vibration producing device 14 can be varied in a manner and for a purpose to be presently described in detail.

The two vibration detectors 21 and 22 may be of any suitable type. If desired, these devices may be constructed the same as the vibration transmitters 11 and 12 and function in an inverse manner receiving vibrations from the fluid whose velocity is to be measured and setting up vibrations in the air within the tubes 23 and 24 connected to the electric pickup devices 25 and 26.

The pickup devices 25 and 26 are in the nature of telephone receivers and as shown in Fig. 7 and previously described. As vibrations are set up in the air in tubes 23 and 24, the diaphragms of these devices vibrate, causing the flow of pulsating currents in the circuits 27—28 and 29—30. When these conductors are connected to the amplifier 34 through the selector 31, the sounds produced by the vibrations set up in the pipe 10 may be heard in the receiver 37. Although I have referred to the pickup devices 25 and 26 as being in the nature of telephone receivers yet it can readily be comprehended that a telephone microphone may be employed.

The amplifier 34 is preferably of the well known audion type and a wiring diagram for such an amplifier is shown in detail in Fig. 6. This amplifier consists of one or more audion tubes 89 and 90 which are formed with filaments 91, grids 92, and plates 93. A conductor 94 is connected to both of the filaments 91 of tubes 89 and 90 and is further connected to a switch 95. This switch, in turn is connected to an A-battery 96 which is further connected to a conductor 97, leading back to both of the filaments 91 of said tubes. When switch 95 is closed, both of the filaments of the tubes are energized and the tubes function in the usual manner.

The two conductors 32 and 33, previously referred to, which receive the input for the amplifier are connected in a tuned circuit including a variable condenser 98 and the primary 99 of a transformer 100. Conductors 32 and 33 are directly connected to said condenser and primary, the same being in parallel with respect to one another. The secondary 101 of the transformer 100 is connected through a conductor 102 to the grid 92 of tube 89, while the other side of said secondary is connected through a conductor 103 with the conductor 94 leading to the filaments of the tubes. The plate 93 of tube 89 is connected through a conductor 104 with the primary 105 of another transformer 106. Primary 105 is further connected to a conductor 107, which is connected with the positive side of a B battery 108. This B battery is in turn connected to the conductor 97 through a conductor 109, which as previously brought out is connected to the filaments 91 of the two tubes. The secondary 110 of the transformer 106 is connected through a conductor 111 with the grid 92 of tube 90 while the other side of the secondary of this transformer is connected through a conductor 112 with the conductor 94 leading to the A battery 96. The output from the tube 90 passes through a tuned circuit including a transformer 113 provided with a primary 114 and a secondary 115 and a variable condenser 116. The plate 93 of tube 90 is connected through a conductor 117 with the primary 114 of transformer 113, said primary being further connected through a conductor 118 to the conductor 107 leading from the B battery 108. The secondary 115 of transformer 113 is connected in parallel with the condenser 116 to the two conductors 35 and 36 leading to the head phone 37. The amplifier 34 is tuned through the two variable condensers 98 and 116 to the frequency of the vibrations set up by the vibration producing device 14, which as previously described, was actuated through the generator 20 of electrical pulsating current. When properly tuned, weak vibrations set up in the pipe 10 are amplified so that the same may be readily heard in the receiver or phone 37 when the amplifier is connected to either of the electric pick-up devices 25 or 26.

In using the meter the fluid whose velocity is to be measured is brought to rest within the pipe 10. The tube 88 is next adjusted with respect to the portion 86 of tube 73 so that the sound procured, when the selector is connected to either stations C or D, is a minimum at both of these stations. The relation of the tube 88 and sleeve 86 is then noted and reference marks made on the same. This position of the parts of the tube structure will hereinafter be referred to as the normal position of the tube structure. The fluid whose velocity is to be measured is then caused to flow through pipe 10 and the selector 31 shifted to connect the pickup device 25 operating with detector 22 to the amplifier 34. Tube 88 is next adjusted relative to portion 86 of tube 73 so that sound in phones 37 is again a minimum. The relative movement of the parts of the tube structure from normal position is then measured. Selector 31 is then shifted to its other position so that the pickup device 26 is connected to the amplifier 34 and the procedure repeated. The relative movement of the parts from normal position is again measured. After these measurements have been taken the frequency of the generator 20 is determined, and from this data the velocity of flow of the fluid may be calculated.

Before going into the method of computing the velocity of flow of the fluid, it has been thought to be of advantage to explain the theory of operation and to state the assumption on which the theory is based. This can best be comprehended by reference to Fig. 11. The pipe 10 is assumed to be smooth upon the interior thereof and free from obstructions which might cause a reflection of the vibrations set up in the fluid passing through the same. The said pipe, as stated, has been assumed to be of sufficiently great length so that the reflections from the ends of the pipe would be dissipated before the same might return to the meter proper. The frequency of the electric generator 20 is preferably such that a fairly long wave length results and for the sake of illustration, the frequency selected has been assumed to be such as to produce three whole wave lengths between the two stations A and B, the fluid being at rest. The branch 71 of tube 13 is located at a locality such that the paths of travel of the vibration set-up in the two branches of said tube are of different lengths and so that the difference in length is approximately equal to one-half a wave length. It will be readily comprehended that when the generator 20 is set into operation, the vibration producing device 14 sets up vibrations in the air column within branch 119 of tube structure 13 which travel through the branches 120 and 121 of said tube structure. The vibration of the air within said tube structure is transmitted through the two vibration transmitters 11 and 12 and imparted to the fluid in the pipe 10. Assuming the fluid to be at rest, the curve 122 (Fig. 11) would represent the vibration set up at station B and the curve 123 represent the vibration set up at station A. The waves produced at these stations would hence be out of phase due to the fact that the paths through which the vibrations are transmitted are of different length. If the difference in the length of the path through branches 120 and 121 were exactly equal to one-half a wave length and the intensity of waves 123 is adjusted to equal that of wave 122 by means of valve 83 there would be destructive interference between the two waves and no disturbance would be present at either stations C or D of the meter. In such case by placing the amplifier 34 and phone 37 in operation and by connecting the same to either of the electric pickup devices 25 or 26 through the selector 31, no sound would be heard in the phones at either station C or D during a continuance of such conditions. If, however, the fluid were flowing in the direction indicated by the arrow, the velocity of travel of the vibration set up in the fluid by the vibration producing device 14 would be affected by the velocity of the fluid and complete destructive interference would not result. A sound could then be heard in the phone 37. If, in such case the tube 88 were slid along the bore 87 of the portion 86 of tube 73, the length of the path of the vibrations in branch 121 could be altered and by proper adjustment, complete destructive interference again produced at either of the stations C or D. Due to the fact that the wave length of the vibrations originated at the transmitter 12 is increased by the flow of the fluid and the wave length of the vibrations produced at the transmitter 11 decreased with the fluid flowing as shown, complete destructive interference could not be produced at both stations C and D with one setting of the tube 88 and tube 73, but would require two settings, in each case representing increases in the length of the normal path of the fluid through this branch of the tube structure. By measuring, the movement of the tube 88 with respect to the sleeve 86 as previously described and through knowledge of the frequency of the generator 20, the exact velocity of the fluid in the pipe 20 can be mathematically determined without calibration of the meter as follows:

For the purpose of calculation let V be the velocity of propagation of the vibrations in the pipe 10 when the fluid therein contained is at rest. Also let F be the frequency of the pulsating current generated by the generator 20 and consequently the frequency of the vibrations set up by the vibration producing device 14 and transmitted to the fluid in the pipe 10 through transmitters 11 and 12. Then $$\frac{V}{F}$$

will be the wave length of a vibration having the frequency F. If we now let N be the number of wave lengths in the distance $a$ between stations A and B, then $a$ would equal $$\frac{NV}{F}$$

For the sake of illustration, the distance $a$ has been assumed to be equal to a whole number of wave lengths which as previously stated, has been chosen as three.

If the fluid in pipe 10 is assumed to be in uniform motion from right to left as indicated by the arrow in Fig. 11 with a velocity $v$, the velocity of propagation of the vibrations in the fluid in pipe 10 from right to left would be $V+v$. Since the wave length in such case would be greater than when the fluid was at rest, the number of wave lengths in the distance $a$ between stations A and B would no longer be N, but a smaller number. Such number might be indicated by $N-K_1$ where $K_1$ represents a fractional part of the new wave length, $$\frac{V+v}{F}$$

In such case, the distance $a$ would be equal to $$(N-K_1)\frac{V+v}{F}$$

assuming that the path through branch 120 of tube structure 13 remained fixed. It would then become necessary in order to obtain destructive interference at C to decrease the path through branch 121 by the same fractional part of a wave length, namely $K_1$. This would be effected by telescoping the tube 88 with respect to the portion 86 of tube 73 a distance which might be designated by the reference character $S_1$. This adjustment, however, would not give rise to maximum destructive interference at D since the velocity of propagation of the vibrations from left to right would be $V-v$. Since the wave length from left to right would be smaller than when the fluid was at rest, the number of wave lengths in distance $a$ would be larger than N and might be represented by the symbols $N+K_2$ where $K_2$ represented a fractional part of the new wave length in conduit 10. In such case, the distance $a$ would be equal to $$(N+K_2)\frac{V-v}{F}$$

To obtain maximum destructive interference at D it would be necessary to lengthen the path through branch 129 by the same fractional part of a wave length, namely $K_2$. This would be again be effected by telescoping said branch and lengthening it over its normal position an amount referred to by the reference character $S_2$.

If W, be considered the wave length in the tube structure 13, then $K_2$ and $K_1$ may be computed from the wave length and the distances representing the adjustment of the tube structure 13 in accordance with the following formula:

$$\frac{S_2}{W}=K_2$$

and $$\frac{S_1}{W}=K_1$$

By solving the two simultaneous equations previously referred to defining the distance $a$ in terms N, K, V, and F and by eliminating V from these equations, the velocity of the fluid in the pipe can be obtained which is represented in the following equation:

$$v=\frac{aF(K_1+K_2)}{2(N-K_1)(N+K_2)}$$

By substituting the values of $K_2$ and $K_1$, the velocity of the fluid may be determined from the distance $a$, the number of waves in said distance, the adjustments of the tube structure and the wave length of the vibrations in the tube structure. Where $K_1$ and $K_2$ are small in comparison with N, the velocity $v$ is closely approximated by the following formula:

$$v=\frac{af}{2N^2}(K_1+K_2)$$

In some practical cases, a straight pipe of sufficient length to dissipate the vibrations which might be reflected from irregularities in the pipe structure and the ends of the pipe or bends therein cannot readily be procured, I hence found it desirable to develop the device shown in Fig. 1 which makes it possible to determine accurately the rate of flow in the pipe regardless of the form or construction thereof, except in the length of the pipe in which the apparatus is installed. The method by means of which this is made possible consists in setting up the vibrations at four stations in the pipe in such a manner that when the various tubes are properly adjusted, all of the vibrations in the pipe are eliminated except in the length of pipe in which the meter is installed. There being no vibrations in the external portions of the pipe there can be no reflected vibrations to interfere with the proper determination of the velocity of the fluid and consequently the same may be procured with equally as great accuracy as where ideal conditions exist.

In the form of the invention shown in Fig. 1, two units are employed instead of a single unit as shown in Fig. 11 and the units are connected together. Also in this form of the invention, adjustment is had by simultaneously lengthening one branch of the tube structure and shortening the other instead of procuring the entire adjustment of one branch only. The particular construction by means of which this is accomplished will now be described in detail. It is again assumed that the meter is installed in the pipe 10. In this form of the invention, four vibration transmitters 143, 144, 145, and 146, are employed which are situated at locations designated as stations E, F, G, and H. All of these vibration transmitters are the same as the transmitters 11 and 12 and the same reference characters have been used for the corresponding parts of all of them. The two vibration transmitters 143 and 144 are connected together through a tube structure 124, shown in detail in Figs. 1 and 3. The fittings 76 of these vibration transmitters are connected to bent tubes 125 and 126, which are connected to suitable valves 127 and 128. The valves 127 and 128 are connected to a straight tube 129, which extends parallel to the pipe 10 and which is formed with a slot or opening 130, slightly to one side of the middle of the tube structure. In like manner, the two vibration transmitters 145 and 146 are connected through fittings 76 thereof, to bent tubes 131 and 132 forming part of a tube structure 147 which tubes in turn are connected to valves 133 and 134. Valves 133 and 134 have connected to them a straight tube 135, similar to the tube 129, and parallel therewith, which tube has formed in it a slot, the same being situated to one side of the middle of the tube structure the same as the slot 130 of the tube structure 124. Slidably mounted on the tubes 129 and 135 are two sleeves 136 and 137 which cover the slots 130. These sleeves have secured to them, two bent tubes 138 and 139, which are secured to valves 140 and 141. The valves 140 and 141 have secured to them a straight tube 142 extending parallel with the tubes 129 and 135 and the pipe 10, which tube, as shown in Fig. 2 is formed with a slot 343 similar to the slots 130 of tubes 129 and 135. The tubes 138, 139, and 142 form another tube structure which I have indicated in its entirety at 148. The tubes 138, 139 and 142 are in communication with the sleeves 136 and 137 and by means of the slots 130 are further in communication with the tubes 129, 125, 126 and the vibration transmitters 143 and 144, and likewise the vibration transmitters 145 and 146. As the tube structure 148 including two sleeves 136 and 137 is shifted, the lengths of the paths through the two branches of both of the tube structures 124 and 147 is varied and the relation of the vibrations set up at the transmitters 143, 144, 145, and 146 varied to meet with the requirements.

For the purpose of shifting the tube structure 148 relative to the tube structures 124 and 147, a device is employed which is illustrated in detail in Fig. 3. An arm 149 is employed which is formed at one end with a clamp 150 by means of which the same may be rigidly attached to tube 129 of the tube structure 124. Between the ends of this arm there is provided a guideway 151 along which the tube 138 is slidable. A second arm 152 is likewise attached to the tube 138 through a clamp 153. This clamp is threaded at one end to receive a screw 154 which passes through the outer end of the arm 149 and which is rotatably mounted therein. This screw has attached to it collars 155 and 156 by means of which said screw is deprived of longitudinal movement relative to arm 149. The screw 154 may be rotated by means of a knurled head 157. Tube structure 148 is also slidable relative to the tube structure 147 and for this purpose another arm 158 is employed which is similar to the arm 149 and which is rigidly attached to tube 135 and which slidably supports the tube 139.

The tube 142, as previously referred to, is formed with a slot or opening 343 between the ends of tube structure 148, said slot being positioned toward one side of the middle of said tube structure. A sleeve 159 surrounds this tube and is slidable thereon, said sleeve serving to cover the slot or opening 343. Sleeve 159 has attached to it another tube 160 which is similar to the tube 71 of the form of the invention shown in Fig. 11 and which for the sake of convenience will hereinafter be referred to as tube structure 163. The tube 160 is in communication with tube 142 through slot 343 and has attached to it a vibration producing device 162 identical with the vibration producing device 14 previously referred to. The method of attachment of the tube 160 to the vibration producing device 162 and the construction of the vibration producing device being identical with that previously described, the same has not been illustrated in detail.

The tube structure 163 may be moved along the tube 142 through an adjusting device shown in detail in Fig. 2 and similar to that illustrated in Fig. 3. This device comprises an arm 164 which is formed with a clamp 165 by means of which said arm may be rigidly attached to the tube 142. The arm 164 is threaded as indicated at 198 to receive a threaded adjusting screw 167. This screw is rotatably mounted in another arm 168 which is rigidly attached to the sleeve 159 through a clamp 169. The screw 167 has attached to it two collars 170 and 171 which deprive the same of longitudinal movement with respect to the arm 168. As the screw 167 is rotated through a knurled head 172 the tube structure 163 is shifted along the tube 142.

For the purpose of measuring the movement of the tube structure 148 with respect to the tube structures 124 and 147 and for measuring the movement of the tube structure 163 with respect to the tube 142, a scale is employed which is indicated at 173 in Figs. 1 and 2. This scale is attached at one end to the arm 164 through a bracket 174 and is attached at its other end through bracket 175 to tube 142. The bracket 175 is formed with a clamp 176 by means of which the same may be secured to said tube while screws 177 and 178 serve to hold the scale secured to said brackets. The brackets 174 and 175 are so disposed that the scale 173 lies between the pipe 10 and the tube 142. The scale 173 has two sets of graduations on the same indicated at 179 and 180. An arm 181 rigidly secured to sleeve 159 is adapted to ride along the scale 173 and is formed with a pointer 182, movable along the graduations 180. A similar arm 183 attached to the pipe 10 is provided with a pointer 184 adapted to move relative to the graduations 179. The arm 183 is formed with a band 185 adapted to encircle the pipe 10, which band is constructed with a clamp 186 by means of which the same may be rigidly secured to the pipe.

The vibration producing device 162 is connected through conductors 187 and 188 with the secondary 189 of a transformer 190. The primary 191 of this transformer is connected through conductors 192 and 193 with an electric generator 194 identical with the generator 20 previously referred to. This generator includes a battery 195 connected to it through conductors 196 and 197 in identically the same manner as the generator 20 and battery 63 of the form of the invention previously referred to. These parts having been previously described, will not be again described in reference to this form of the invention.

At stations I and J in the pipe 10 which correspond to the stations C and D of said pipe in the form of the invention shown in Fig. 11 are situated two vibration detectors 199 and 200. These detectors are identical with the detectors 21 and 22 and have connected to them electric pickup devices 201 and 202 identical with the pickup devices 25 and 26. By means of a selector 203 identical with selector 31 and circuits 204, 205 and 206 connected therewith, the pickup devices may be connected to an amplifier 207 identical with the amplifier 34. This amplifier includes a head phone 208 which is connected to the amplifier through a circuit 209, which head phone is identical with the head phone 37.

The method of using the device shown in Fig. 1 is quite similar to that described in conjunction with the device shown in Fig. 11. The fluid in pipe 10 is first brought to rest and the tube structures 148 and 163 adjusted until sound heard in the earphone 208 is a minimum when the selector 203 is connected to either of the electric pickup devices 201 or 202. The scale 173 is then adjusted by loosening clamps 176, 165, and 169, until the pointer 182 is opposite the zero mark of the graduation 180. The band 185 holding arm 183 attached to the pipe 10, is also loosened by releasing clamp 186 and pointer 184 caused to lie opposite the zero mark of graduation 179. The various clamps may then all be tightened and the apparatus is ready for use. The fluid whose velocity is to be measured is then caused to flow from right to left through the pipe 10, and selector 203 operated to connect the pickup device 201 with the amplifier 207. Tube structure 148 is now shifted by means of the adjusting screw 154 until the sound perceptible in the head phone 208 is a minimum. Selector 203 is then operated to connect the electric pickup device 202 with amplifier 207 and the tube structure 163 adjusted with respect to tube 142 until the sound heard is a minimum. Adjustment of tube structure 163 may disturb the adjustment of tube structure 148 and readjustment of the same may, therefore, become necessary. In such case, the selector 203 is reversed and the procedure repeated. The adjustment through the two screws 167 and 154 continues until the sound heard in the head phones from both stations I or J is a minimum. Sound intensity adjustments are made as previously described by means of valves 127, 128, 133, 134, 141, 140. After such condition has been found, readings are taken of the movement of the pointers with respect to graduations 179 and 180. These readings together with the value of the frequency of the generator 194 are used to determine the velocity of flow. It will readily be understood, however, that if desired the scales 179 and 180 may be marked to read directly in terms of velocity of flow, thereby eliminating the necessity of computation.

The theory of operation of the invention shown in Fig. 1 is the same as that illustrated in Fig. 11. However, with the form of the invention shown in Fig. 1, reflection of vibrations which would otherwise be caused by irregularities, bends, or other obstructions in the pipe are eliminated. This is effected in the following manner. Referring to Fig. 1 and assuming the fluid to be in motion from right to left as indicated by the arrow, tube structure 148, including slides 136 and 137, is moved by turning hand wheel 157, with selector 203 connected to electric pickup device 201, until the observer listening to the sound emanating from head phone 208 observes a minimum sound. It will be understood from the explanation of the operation of the simplified form of the device previously given that the operation of sliding tube structure 148 and slides 136, 137 has the effect of simultaneously adjusting the sound paths in the left and right branches of tube structure 124 and 147 in such manner as to cause destructive interference of sound propagated from right to left. Adjustments of valves 127, 128, 133, and 134 are also made to reduce the minimum sound to a still lower level in the same manner as was done in the simplified form of the apparatus. It is clear from the explanation of the simplified device that the adjustment described is not sufficient to insure that vibrations emanating from stations E and F destructively interfere in such manner as to produce minimum sound heard at listening station J, nor is this true of vibrations emanating from stations G and H and heard at J. The condition of minimum vibrations propagated from left to right to the listening station J may be effected independently of the previous adjustments made, that is without in any way disturbing the condition of the minimum vibrations propagated from right to left toward station I. This is done by turning wheel 172 thereby sliding tube structure 163 relative to tube structure 148 and thereby altering the relative lengths of the sound paths from vibration generator 162 to vibration transmitters 143 and 145 and in such manner that vibrations emanating from said transmitters combined in a resultant minimum vibration at listening station J. It will be observed that the same adjustment is simultaneously made for vibration transmitters 144 and 146 so that the vibrations from these two transmitters propagated from left to right combine at listening station J to form a minimum. Valves 140 and 141 may be adjusted to regulate the intensity of the vibrations so as to effect a more nearly complete destructive interference at J.

It will be understood that since the adjustments have been made so as to eliminate vibrations propagated from left to right past station I, that there will be no vibrations propagated due to irregularities in pipe 10 which may exist outside of the region included between I and J, and which irregularities would otherwise result in vibrations being reflected at such places returning to the meter proper and interfering with the proper adjustment thereof.

Instead of producing destructive interference between the vibrations emanating from the various stations in the pipe 10 by adjusting the relative lengths of the paths from the sound generator to the various stations, the same may be accomplished by changing the phase relation of the various vibrations electrically instead of by performing the same result mechanically. A device utilizing this principle is illustrated in Fig. 9. This device is exactly the same as that shown in Fig 1, except that the various tube structures are dispensed with and a separate vibration producing device employed for each of the vibration transmitters 143, 144, 145, and 146, which are designated by reference numerals 226, 227, 228, and 229. The vibration detectors, amplifier, and the generator of the vibrations are identical in this form of the invention and the same reference characters have been used to designate the like parts in the two forms of the invention. In the device shown in Fig. 9, the conductors 187 and 188 are connected to two phase shifters 211 and 212 through branch circuits 213, 214 and 215—216. The phase shifter 212 is in turn connected through conductors 217 and 218 with branch conductors 219—220 and also branch conductors 221—222. The conductors 219 and 220 are connected to another phase shifter 223 which in turn is connected through conductors 224 and 225 with the vibration producing device 228. The conductors 221—222 are connected to phase shifter 230 which is connected through conductors 231 and 232 with the vibration producing device 229. The phase shifter 211 is connected through conductors 233 and 234 to branch conductors 235—236 and 237—238. A phase shifter 239 is connected to conductors 235 and 236 and is further connected through conductors 240 and 241 with the vibration producing device 226. In exactly the same manner a phase shifter 242 is connected to conductors 237 and 238 and is further connected through conductors 243 and 244 with the vibration producing device 227.

The phase shifting devices 211, 212, 223, 230, 239, and 242 may be of any desired type, such as is now well known in the art. One such device is shown in Fig. 10, which, however, is merely illustrative. This device is shown as illustrating the phase shifter 211 and shows the conductors 213 and 214 entering the same and the conductors 233 and 234 leaving said phase shifter. The phase shifter 211 constitutes a number of units, three being shown in the particular device illustrated and indicated at 245, 246, and 247. These units are identical in construction, excepting as to the relative values of the various elements thereof and for this reason only unit 245 will be described in detail. This unit consists of two variable condensers 248 and 249 and two inductances 250 and 251 which may be of fixed value or adjustable as desired. The condenser 248 is connected through conductors 252 and 253 to the two inductances 250 and 251 respectively. These inductances are in turn connected in inverse relation to the condenser 249 through conductors 254 and 255. The condenser 248 is connected through conductors 256 and 257 with two of the poles of a double pole double throw switch 258. The other two poles of this switch are shorted through a conductor 259 while the blades of the switch are connected to a buss 260 which in turn is connected to the conductors 214 and 233. Condenser 249 is likewise connected through conductors 261 and 262 with two of the poles of a double pole double throw switch 263. The other poles of this switch are shorted through a conductor 264 and the blades of this switch are connected to a buss 265 in the same manner as the other switch, which buss is in turn connected to the conductors 234 and 213. Each of the units 245, 246 and 247 are likewise connected to the busses 260 and 265 so that the said units may be connected in series with one another and in the required circuit. The various units operate in a well known manner to change the phase of the current leaving the same without changing the frequency or the magnitude of the current. The change in phase can be effected by cutting in units and the variation procurable depends upon the number of units employed in each phase shifter. When it is desired to cut in one of the phase shifters the switches 258 and 263 are thrown to connect the blades thereof with the respective unit. When not desired, the blades are shifted in the opposite direction to connect the conductors 259 and 264 across the gaps in the busses 260 and 265. Phase changes may also be obtained in a continuous manner and not in steps as described by employing continuously variable condenser and inductance elements well known to the art.

In the use of the invention shown in Fig. 9 it is merely necessary to go through the same procedure as in the form of the invention shown in Fig. 1. In this connection, however, the adjustments are made by manipulating the phase shifters 223 and 239, these shifters being similarly adjusted and the phase shifters 242 and 230 being likewise similarly adjusted so as to produce minimum sound at station I. Similarly phase shifters 211 and 212 are adjusted to produce minimum sound intensity at station J. After the adjustments have been made the velocity of the fluid can be determined. It will be understood from the explanation previously made in connection with Fig. 11 that the alteration in the length of tube structure 13 produced no other result on the sound waves within pipe 10 than altering the phase of the sound emanating from source 12. This alteration in phase can be determined from the alteration in the length of tube structure 13. For the case now considered, the alteration in phase is indicated directly by the phase shifters. The calculation of the fluid velocity is then identical with that previously described.

Changes in the specific form of my invention, as herein disclosed, may be made within the scope of what is claimed without departing from the spirit of my invention.

Having described my invention, what I claim as new and desire to protect by Letters Patent is:

1. The method of determining the rate of flow of fluids, which consists in setting up mechanical vibrations of the same frequency in the moving fluid at two localities along the course of travel thereof, in adjusting the phase of one vibration at one locality relative to the other phase of the vibration at the other locality to produce a determinable effect upon the resultant of the vibrations and in ascertaining the rate of flow of the fluid from the changes of relative phase of the vibrations in the fluid.

2. A fluid meter comprising means for setting up mechanical vibrations of definite frequency, means for transmitting such vibrations to the fluid at two localities along the course of travel thereof and over different paths, means for transmitting the vibrations to the fluid at two other localities in the fluid and over other differing paths, and means for adjusting the various paths of the vibrations to procure destructive interference between the vibrations of the first group and those of the second group.

3. The method of determining the rate of flow of fluids which consists in producing mechanical vibrations of definite determinable frequency, in transmitting the vibrations to the fluid at two localities while the fluid is at a known state of motion, in changing the phase relation between the vibrations at the two localities while the fluid is at the state of motion to be determined to procure predetermined conditions of the vibrations in the fluid and in ascertaining the rate of flow of the fluid from the change in phase of the vibrations at the two localities.

4. A fluid meter comprising means for setting up mechanical vibrations of definite frequency, two vibration transmitters adapted to transmit the vibrations to the fluid whose rate of flow is to be measured, conduits connecting said means with both of the vibration transmitters and having a fluid therein through which the vibrations may be propagated and means for adjusting the relative length of the conduits to procure a change in phase relation between the vibrations at the two transmitters.

5. A fluid meter comprising means for setting up mechanical vibrations of definite frequency, two vibration transmitters adapted to transmit the vibrations to the fluid whose rate of flow is to be measured, conduits connecting said transmitters together, means for adjusting the relative length of said conduits, two other vibration transmitters adapted to transmit the vibrations to the fluid whose rate of flow is to be measured, conduits connecting said second transmitters together, means for adjusting the relative length of said second named conduits, conduits connecting the first named conduits and the second named conduits together and to said means for setting up vibrations and means for adjusting the relative length of said last named conduits.

6. The method of determining the rate of flow of fluids which consists in producing mechanical vibrations of definite determinable frequency, in transmitting the vibrations to the fluid while the fluid is at a known state of motion and at two known localities in the fluid such as to cause a resultant vibration at a certain station in the fluid, in further setting up vibrations of definite determinable frequency, in transmitting such vibrations to the fluid while the fluid is flowing with the velocity which is to be determined and at two known localities in the fluid such as to cause a resultant vibration at a certain station in the fluid, in varying the phase of the vibrations at one of the last named localities of introduction into the fluid to produce a resultant vibration at the last named station which will be definitely related to the resultant vibration first referred to, and in ascertaining the rate of flow of the fluid from the relation between the phases of the vibrations in both instances.

7. In a fluid meter, a conduit, detecting devices at two spaced stations in the conduit, means for setting up mechanical vibrations of definite frequency, means for transmitting such vibrations to the fluid intermediate such stations at a plurality of localities, means for adjusting the phase of the vibrations at such localities to limit the vibrations to the region between said stations.

8. The method of determining the rate of flow of fluids which consists in transmitting mechanical vibrations of definite determinable frequency to the fluid at two localities, in adjusting the paths of the vibrations to procure destructive interference of the vibrations in one direction, in transmitting mechanical vibrations of definite determinable frequency to the fluid at two other localities, in adjusting the paths of said vibrations to procure destructive interference of the vibrations in one direction, in further adjusting the paths of the vibrations to procure destructive interference between the first named vibrations and the second named vibrations and in ascertaining the rate of flow of the fluid from the relative lengths of the paths.

9. The method of determining the rate of flow of fluids which consists in producing mechanical vibrations of definite determinable frequency, in transmitting the vibrations to the fluid at two localities, while the fluid is at rest, in adjusting the phase relation between the vibrations to procure destructive interference, in transmitting vibrations of the same frequency to the fluid at the same localities while the fluid is in motion, in readjusting the phase relation of the vibrations to again procure destructive interference, and in ascertaining the rate of flow of the fluid from the change in phase relation of the vibrations.

10. A fluid meter comprising a conduit through which the fluid passes, a device for setting up mechanical vibrations of definite frequency, two vibration transmitters positioned in said conduit at spaced localities, tubes connecting said device with said transmitters, means for adjusting the relative lengths of said tubes to vary the phase relation of the vibrations emanating from said transmitters, and a detector responsive to vibrations in the fluid.

11. A fluid meter comprising a conduit through which the fluid passes, two vibration transmitters positioned in said conduit at spaced localities, means for setting up mechanical vibrations of definite frequency in one of said transmitters, means for setting up mechanical vibrations of the same frequency in the other of said transmitters, means for varying the phase relation between said vibrations at the transmitters and a detector responsive to vibrations in the fluid.

12. An apparatus for determining the rate of flow of fluids which comprises a conduit for the fluid whose rate of flow is to be measured, means for setting up mechanical vibrations of the same frequency in the moving fluid at a plurality of localities along the conduit, means for adjusting the phase of the vibrations at one locality with respect to the phase of the vibrations at another locality to produce a determinable effect upon the resultant of the vibrations, means responsive to said vibrations for determining said resultant, and means for measuring the degree of adjustment of said adjusting means.

13. In a fluid meter, means for transmitting mechanical vibrations of definite determinable frequency to the fluid at two localities along the course of travel thereof, means for adjusting the paths of the vibrations to procure destructive interference of the vibrations in one direction, means for transmitting mechanical vibrations of definite determinable frequency to the fluid at two other localities along the course of travel thereof, means for adjusting the paths of said vibrations to procure destructive interference between the second named vibrations in one direction, means for further adjusting said paths to procure destructive interference between the first named vibrations and the second named vibrations, and indicating means for indicating the existence of vibrations and subjected to said vibrations.

14. In a fluid meter, a conduit through which the fluid whose velocity is to be measured travels, vibration detectors in said conduit at spaced localities, means for transmitting vibrations of definite frequency to the fluid in said conduit at a plurality of spaced localities within said conduit, and between said vibration detectors, and means for adjusting the relative phase of the vibrations to procure determinable effects upon said vibration detectors.

15. In a fluid meter, a conduit through which the fluid whose velocity is to be measured travels, vibration detectors in said conduit at spaced localities, means for transmitting vibrations of definite frequency to the fluid in said conduit at two spaced localities within said conduit and between said vibration detectors, and means for adjusting the relative phase of the vibrations to procure determinable effects upon said vibration detectors.

16. In a fluid meter, a conduit through which the fluid whose velocity is to be measured travels, vibration detectors in said conduit at spaced localities, means for transmitting vibrations of definite frequency to the fluid in said conduit at four spaced localities within said conduit and between said vibration detectors, means for adjusting the relative phase of the vibrations at two localities to procure a determinable effect upon one of said vibration detectors, and means for adjusting the relative phase of the vibrations at the other two localities to produce a determinable effect upon the other vibration detector.

17. A fluid meter comprising means for setting up mechanical vibrations of definite frequency, two sets of vibration transmitters for transmitting the vibrations to the fluid at different localities, means for adjusting the phase of the vibrations at the transmitters of one set with reference to the phase of the vibrations at corresponding transmitters of the other set to procure a predetermined phase relation therebetween, and vibration detectors for determining the resultant effects of said vibration.

18. A fluid meter comprising means for setting up mechanical vibrations of definite frequency, means for transmitting the vibrations to the fluid over two paths independently of the fluid at two localities along the course of travel thereof to produce vibrations of the same frequency at such localities acting simultaneously at the same region of the fluid to produce a determinable effect, means for varying the length of one of said paths to vary the resultant effect of the vibrations on the fluid, and vibration detectors for determining the resultant effects of said vibrations.

19. A fluid meter comprising means for setting up mechanical vibrations of definite frequency, two vibration transmitters adapted to transmit the vibrations to the fluid whose rate of flow is to be measured, conduits connecting said means with both of the vibration transmitters and having a fluid therein through which the vibrations may be propagated and means calibrated in terms proportional to flow for adjusting the relative length of the conduits to procure a change in phase relation between the vibrations at the two transmitters and two vibration detectors for determining the resultant effects of said vibrations.

20. In a fluid meter, a conduit for the fluid whose rate of flow is to be measured, means for setting up mechanical vibrations of a certain frequency, a tube connected to said means, branch tubes connected to said tube and to said conduit at spaced localities within said conduit, vibration transmitters within said conduit connected to said branch tubes, means for adjusting the relative lengths of said branch tubes, and vibration detecting means within said conduit.

21. In a fluid meter, a conduit for the fluid whose rate of flow is to be measured, means for setting up mechanical vibrations of a certain frequency, a tube connected to said means, a tube structure connected to said tube and including branch tubes communicating with said conduit at spaced localities, a second tube structure connected to said tube and including branch tubes connected to said conduit at other spaced localities, vibration transmitters within said conduit connected to said branch tubes, means for adjusting the relative lengths of the branch tubes of said first named tube structure, means for independently adjusting the relative lengths of the branch tubes of said second named tube structure, and vibration detecting means within said conduit.

22. In a fluid meter, a conduit for the fluid whose rate of flow is to be measured, means for setting up mechanical vibrations of a certain frequency, a tube connected to said means, branch tubes connected to said tube and to said conduit at spaced localities within said conduit, vibration transmitters within said conduit connected to said branch tubes, means for adjusting the relative lengths of said branch tubes, and two spaced vibration detectors within said conduit between which said vibration transmitters are situated.

23. In a fluid meter, a conduit for the fluid whose rate of flow is to be measured, means for setting up mechanical vibrations of a certain frequency, a tube connected to said means, a tube structure connected to said tube and including branch tubes communicating with said conduit at spaced localities, a second tube structure connected to said tube and including branch tubes connected to said conduit at other spaced localities, vibration transmitters within said conduit connected to said branch tubes, means for adjusting the relative lengths of the branch tubes of said first named tube structure, means for independently adjusting the relative lengths of the branch tubes of said second named tube structure, and two spaced vibration detectors disposed within said conduit and between which all of said vibration transmitters are situated.

HENRY E. HARTIG.